United States Patent
Saito et al.

(10) Patent No.: US 7,385,017 B2
(45) Date of Patent: Jun. 10, 2008

(54) SILICONE RESIN COMPOSITIONS AND MOLDED ARTICLES THEREOF

(75) Inventors: Takashi Saito, Chiba (JP); Masayoshi Isozaki, Chiba (JP); Hideki Andoh, Chiba (JP)

(73) Assignee: Nippon Steel Chemical Co., Ltd., Tokyo (JP)

( * ) Notice: Subject to any disclaimer, the term of this patent is extended or adjusted under 35 U.S.C. 154(b) by 238 days.

(21) Appl. No.: 10/544,391

(22) PCT Filed: Mar. 22, 2004

(86) PCT No.: PCT/JP2004/003828

§ 371 (c)(1),
(2), (4) Date: Aug. 3, 2005

(87) PCT Pub. No.: WO2004/085501

PCT Pub. Date: Oct. 7, 2004

(65) Prior Publication Data

US 2006/0052567 A1 Mar. 9, 2006

(30) Foreign Application Priority Data

Mar. 27, 2003 (JP) .............................. 2003-088739

(51) Int. Cl.
*C08F 30/08* (2006.01)
(52) U.S. Cl. .................. 526/279; 522/99; 526/308; 526/309; 526/321; 526/323.1; 526/323.2; 526/328; 526/328.5
(58) Field of Classification Search .................. None
See application file for complete search history.

(56) References Cited

U.S. PATENT DOCUMENTS 4,889,901 A 12/1989 Shama et al.
6,972,312 B1 * 12/2005 Lichtenhan et al. ........... 528/14
7,198,639 B2 * 4/2007 Lai et al. .................. 623/6.11
2004/0163570 A1 * 8/2004 Vanmaele et al. ........ 106/31.13

FOREIGN PATENT DOCUMENTS

| JP | 08-048734 A | 2/1996 |
|---|---|---|
| JP | 2002-256033 A | 9/2002 |
| JP | 2002-363414 A | 12/2002 |
| JP | 2003-137944 A | 5/2003 |
| JP | 2003-315959 | * 6/2003 |
| JP | 2004-123936 A | 4/2004 |
| JP | 2004-143449 A | 5/2004 |
| WO | WO-02/50144 A2 | 6/2002 |

OTHER PUBLICATIONS

Printed structure of product No. MA 0735 from the internet site of Hybrid Plastics Co.*
English Translation of International Preliminary Report dated Nov. 17, 2005.
Supplementary European Search Report by EPO, App. No. 04722461.3-1214, Reference EPP92941, Jul. 25, 2007 (3 pages).

* cited by examiner

*Primary Examiner*—Marc S Zimmer
(74) *Attorney, Agent, or Firm*—Cheng Law Group PLLC

(57) ABSTRACT

This invention relates to a silicone resin composition which exhibits high heat resistance, high transparency and high dimensional stability and thus can be suitably used for optical applications such as a lens, an optical disc, an optical fiber, a substrate for a plat panel display, a window material for an automobile, and the like. A silicone resin composition, which comprises a silicone resin comprising, as a primary component, a polyorganosilsesquioxane being represented by the formula: $[RSiO_{3/2}]_n$, wherein R represents an organic functional group having a (meth)acryloyl group, and n is 8, 10 or 12, and having a cage type structure in its structural unit, and an unsaturated compound having, in its molecule, at least one unsaturated group represented by $-R_3-CR^4=CH_2$ or $-CR^4=CH_2$, wherein $R^3$ represents an alkylene group, an alkylidene group or a $-OCO-$ group and $R^4$ represents a hydrogen atom or an alkyl group, and being capable of radically copolymerizing with the above silicone resin, in a weight proportion of 1:99 to 99:1.

17 Claims, No Drawings

SILICONE RESIN COMPOSITIONS AND MOLDED ARTICLES THEREOF

TECHNICAL FIELD

This invention relates to silicone resin compositions and three-dimensional crosslinked articles molded therefrom.

BACKGROUND TECHNOLOGY

Inorganic glasses are highly transparent, heat-resistant and dimensions stability and, on account of these properties, they have been used from old days in a wide variety of industrial sectors as structures which divide the space while transmitting visible light without obstructing the visibility. In spite of such excellent properties, inorganic glasses have two grave shortcomings; first, they are heavy with the specific gravity amounting to 2.5 or more and, second, they have poor impact resistance and fracture easily. In recent years, as a result of the continuing drive toward downsizing such as reduction in weight and thickness of the products in all kinds of industries, there is an increasingly stronger demand from the users for improvements to remedy the aforementioned shortcomings.

Transparent thermoplastics and thermosets are being counted on as materials to meet such a demand from the industries. Transparent thermoplastics are exemplified by polymethyl methacrylate (PMMA) and polycarbonate (PC). Of these transparent thermoplastics, PMMA is otherwise called organic glass and it is highly transparent and drawing attention as a material which has overcome the two shortcomings of glasses. However, these transparent plastics are markedly inferior to inorganic glasses in heat resistance and coefficient of linear thermal expansion and face a problem of limited usage.

On the other hand, transparent thermosets are exemplified by epoxy resins, curable (meth)acrylic resins and silicone resins and they generally show higher heat resistance than the aforementioned thermoplastics. Of the transparent thermosets, epoxy resins show small curing shrinkage and excellent moldability, but have a shortcoming of low impact resistance and brittleness. Curable (meth)acrylic resins are well balanced in heat resistance, moldability and properties of molded articles, but have shortcomings of large changes in dimension by water absorption and in coefficient of linear expansion by heat.

Silicone resins are superior to other thermosets in heat resistance, weatherability and water resistance and provide materials with high potentialities of solving the aforementioned problems associated with plastics and serving as substitutes for inorganic glasses. In particular, polyorganosilsesquioxanes of a ladder structure are known to show heat resistance comparable to that of polyimides.

One example of such polyorganosilsesquioxanes is prepared as follows according to methods disclosed in JP40-15989, JP50-139900A and J. Polymer Sci., Part C, No. 1, pp. 83-97 (1963): phenyltrichlorosilane is hydrolyzed in an organic solvent to phenyltrihydroxysilane, the hydrolysis product is heated in a water-free solvent in the presence of an alkaline rearrangement and condensation catalyst to give cage type octaphenylsilsesquioxane and the cage type octaphenylsilsesquioxane is separated and heated again in the presence of an alkaline rearrangement and condensation catalyst to give a phenylsiloxane prepolymer of low intrinsic viscosity; or the prepolymer is further heated in the presence of an alkaline rearrangement and condensation catalyst to give a phenylsilsesquioxane polymer of high intrinsic viscosity.

Now, the siloxane linkage in silicone resins including the polyorganosilsesquioxanes prepared in the aforementioned manner is highly flexible and it is necessary to increase the crosslinking density in order to develop modulus required for structures. However, increasing the crosslinking density is undesirable as it markedly increases the curing shrinkage thereby rendering molded particles brittle. Furthermore, the curing shrinkage increases the residual stress and this makes it extremely difficult to obtain thick-walled molded articles. For this reason, silicone resins with a high crosslinking density are limited in use to coating applications and, at the present time, only silicone rubbers with a low crosslinking density are used in molding applications. A method for copolymerizing silicone resins with acrylic resins of good moldability is disclosed in the Journal of the Chemical Society of Japan, 571-580 (1998); according to this method, an acrylic polymer having alkoxysilyl side chains is used as a nonladder type silicone resin and it is copolymerized with an alkoxysilane to form a hybrid consisting of an acrylic polymer as organic ingredient and a polysiloxane as inorganic ingredient. However, silicone resins intrinsically show poor compatibility with acrylic resins and, in many cases, the optical properties, particularly light transmission, are damaged even when there is no problem with mechanical strength.

A molded article of a silanol-free silicone resin disclosed in JP10-251407A shows excellent heat resistance and optical properties. However, a silicone resin prepared from a cage type polyorganosilsesquioxane and a disiloxane containing a reactive functional group by equilibration reaction in the presence of an alkaline rearrangement and condensation catalyst has a small number of reactive functional groups, 1.1 on the average, in the molecule and is assumed to participate little in the three-dimensional crosslinked structure in the molded article. That is, increasing the proportion of silicone resin which contributes to characteristics such as heat resistance, weatherability and water resistance decreases the absolute number of reactive functional groups in the molded article and this in turn decreases the crosslinking density and hinders satisfactory construction of a three-dimensional crosslinked structure. As a result, the molded article shows deterioration in heat resistance and mechanical properties.

DISCLOSURE OF THE INVENTION

Accordingly, an object of this invention is to provide a silicone resin composition capable of giving a molded article which retains transparency and other optical properties, heat resistance and weatherability characteristic of silicone resins and additionally shows good dimensional stability (low linear expansion) and low water absorption.

The inventors of this invention have made extensive studies to attain the aforementioned objective, found that a silicone resin composition formulated from a cage type silicone resin containing an increased number of reactive functional groups and an unsaturated compound radically copolymerizable with the cage type silicone resin at a specified ratio gives a transparent molded article well balanced in heat resistance, mechanical properties, dimensional stability and the like and useful as a substitute for inorganic glasses and completed this invention.

Thus, this invention relates to a silicone resin composition which comprises a silicone resin mainly constituted of a polyorganosilsesquioxane represented by general formula (1)

$$[R\,S\,i\,O_{3/2}]_n \quad (1)$$

(wherein R is an organic functional group containing a (meth)acryloyl group and n is 8, 10 or 12) and containing a cage type structure in its constitutional unit and an unsaturated compound containing at least one unsaturated group represented by —$R^3$—$CR^4$=$CH_2$ or —$CR^4$=$CH_2$ (wherein $R^3$ is an alkylene group, an alkylidene group or a —OCO— group and $R^4$ is hydrogen or an alkyl group) in the molecule and radically copolymerizable with said silicone resin at a ratio by weight of 1:99 to 99:1.

One of preferred modes of the execution of this invention is to incorporate in the composition an alicyclic unsaturated compound represented by the following formula (2) in such a way that it accounts for 10-100 wt % of the unsaturated compound radically copolymerizable with the silicone resin. In general formula (2), Z denotes the group represented by the following formula (2a) or (2b).

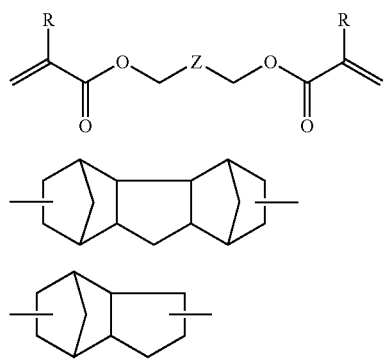

(2)

(2a)

(2b)

Furthermore, when a silicone composition is formulated from the aforementioned silicone resin, nonalicyclic unsaturated compound and alicyclic unsaturated compound, the mix ratio (silicone resin):(nonalicyclic unsaturated compound):(alicyclic unsaturated compound) is controlled desirably at (5-80):(0-80):(0-80) on a weight basis.

The silicone resin used here is preferably prepared by submitting a silicon compound represented by general formula (3)

$$RSiX_3 \quad (3)$$

(wherein R is an organic functional group containing a (meth)acryloyl group and X is a hydrolyzable group) to hydrolysis and partial condensation in a polar solvent in the presence of a basic catalyst and further submitting the hydrolysis product to recondensation in a nonpolar solvent in the presence of a basic catalyst and the silicone resin preferably has a cage type structure containing the same number of silicon atoms and (meth)acryloyl groups in the molecule.

In addition, this invention provides a molded article obtained by radical copolymerization of the aforementioned silicone resin composition.

Further, the molded article of this invention satisfies the requirements (a) through (c) and at least one of the requirements (d) and (e) enumerated below.

(a) The glass transition temperature is 400° C. or above.
(b) The decrement of the dynamic viscoelastic modulus or ΔE' calculated from the following expression is 60% or less:

$$\Delta E' = (E'_{30} - E'_{200})/E'_{30} \quad (I)$$

wherein $E'_{30}$ is the dynamic viscoelastic modulus at 30° C. and $E'_{200}$ at 200° C.

(c) The transmission of visible light in the wavelength range of 400-800 nm is 85% or more.
(d) The saturated water absorption (determined in conformity with JIS K 7209) is 1.0% or less.
(e) The coefficient of linear thermal expansion is 50 ppm/K or less, preferably 40 ppm/K or less.

This invention will be described concretely below.

A silicone resin composition to be formulated according to this invention comprises a silicone resin and an unsaturated compound copolymeizable with said silicone resin as main ingredients. This silicone resin composition is radically copolymerized to yield a silicone resin copolymer. The silicone resin composition is molded with cure or the silicone resin copolymer is molded to give a molded article. The silicone resin copolymer of this invention is crosslinked and a method for molding with cure similar to the ones used for thermosetting resins can be adopted here.

Silicone resins useful for the execution of this invention comprise as main ingredients polyorganosilsesquioxanes (also referred to as cage type polyorganosilsesquioxanes) which are represented by the aforementioned general formula (1) and have a cage type structure in the constitutional unit.

In general formula (1), R is an organic functional group containing a (meth)acryloyl group and n is 8, 10 or 12; preferably R is an organic functional group represented by the following general formula (4) wherein m is an integer of 1-3 and $R_1$ is hydrogen or methyl group.

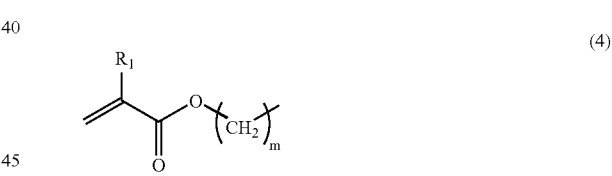

(4)

The conventional silicone resins, regardless of ladder type or nonladder type, are poorly compatible with organic compounds containing a functional group such as acrylic resins and it was not possible to obtain transparent molded articles from their compositions. The silicone resins of this invention, however, assume a quasi-micelle structure because the reactive functional groups highly compatible with organic compounds project out of the cage while the siloxane framework poorly compatible with organic compounds is held inside the cage and, as a result, the resins can be mixed with unsaturated compounds such as acrylic monomers and oligomers at an arbitrary ratio.

A cage type polyorganosilsesquioxane represented by the aforementioned general formula (1) has a reactive functional group on each silicon atom in the molecule. Concretely, the cage type polyorganosilsesquioxane corresponding to the case where n in general formula (1) is 8, 10 or 12 has a structure shown by the following structural formula (5), (6) or (7). The group R in these structural formulas is defined as in general formula (1).

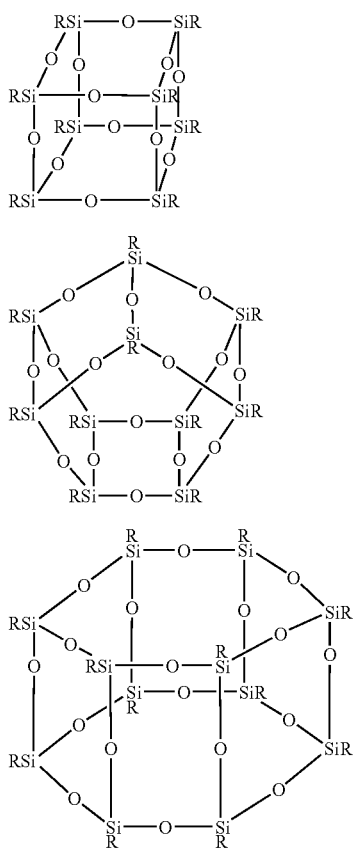

(5)

(6)

(7)

A cage type polyorganosilsesquioxane represented by general formula (1) can be prepared by submitting a silicon compound represented by the aforementioned general formula (3) to hydrolysis and partial condensation in a polar solvent in the presence of a basic catalyst and further submitting the resulting hydrolysis product to recondensation in a nonpolar solvent in the presence of a basic catalyst. In general formula (3), R is an organic functional group containing a (meth)acryloyl group and X is a hydrolyzable group and R is preferably a group represented by the aforementioned general formula (4). Preferred examples of R are 3-methacryloyloxypropyl, methacryloyloxymethyl and 3-acryloyloxypropyl groups.

The hydrolyzable group X in general formula (3) is not limited provided it has a hydrolyzable group and is exemplified by alkoxy and acetoxy, alkoxy being preferable. Such alkoxy groups include methoxy, ethoxy, n- and i- propoxy and n-, i- and t-butoxy, methoxy being preferred because of its high reactivity.

Of the silicon compounds represented by general formula (3), those useful for the execution of this invention include methacryloyloxymethyl-triethoxysilane, methacryloyloxymethyl-trimethoxysilane, 3-methacryloyloxypropyl-trichlorosilane, 3-methacryloyloxypropyl-trimethoxysilane, 3-methacryloyloxypropyl-triethoxysilane, 3-acryloyloxypropyl-trimethoxysilane and 3-acryloyloxypropyl-trichlorosilane. Of the compounds enumerated, 3-methacryloyloxypropyltrimethoxysilane is preferred as it is readily available.

The basic catalysts used for the hydrolysis reaction include alkali metal hydroxides such as potassium hydroxide, sodium hydroxide and cesium hydroxide and ammonium hydroxides such as tetramethylammonium hydroxide, tetraethylammonium hydroxide, tetrabutylammonium hydroxide, benzyltrimethylammonium hydroxide and benzyltriethylammonium hydroxide. Of these compounds, tetramethylammonium hydroxide is used preferably because of its high catalytic activity. The basic catalyst is normally used in the form of its aqueous solution.

In effecting the hydrolysis reaction, the reaction temperature is preferably 0-60° C., more preferably 20-40° C. When the reaction temperature is below 0° C., the reaction rate decreases and the hydrolyzable groups remain unreacted, resulting in a prolonged reaction time. On the other hand, when the temperature is above 60° C., the reaction rate increases too much thereby causing complicated condensation reactions; as a result, the molecular weight of the hydrolysis products increases at an accelerated rate. The reaction time is preferably two hours or more. When the reaction time is short of two hours, the hydrolysis reaction does not proceed sufficiently and the hydrolyzable groups remain unreacted.

The presence of water is indispensable for the hydrolysis reaction. Water may be supplied from the aqueous solution of the basic catalyst or it is added separately in the form of water. Water should be present in an amount more than is enough for the hydrolysis of the hydrolyzable groups, preferably 1.0-1.5 times the theoretical amount. Moreover, it is necessary to use an organic polar solvent during hydrolysis and an alcohol such as methanol, ethanol and 2-propanol or other organic polar solvent may be used. A useful solvent here is a water-soluble lower alcohol containing 1-6 carbon atoms and 2-propanol is preferred. With the use of a nonpolar solvent, the reaction system does not become homogeneous, the hydrolysis reaction does not proceed sufficiently and the unreacted alkoxy groups remain behind.

Upon completion of the hydrolysis reaction, the water or the water-containing reaction solvent is separated. The separation is performed by such means as evaporation under reduced pressure. For satisfactory separation of the water or other impurities, for example, the hydrolysis reaction product is dissolved in a nonpolar solvent, the resulting solution is washed with an aqueous solution of sodium chloride or the like, and the washed solution is dried over a drying agent such as anhydrous magnesium sulfate. The nonpolar solvent can be separated by a means such as evaporation to recover the hydrolysis product; however, there is no need for its separation if it can be used as the nonpolar solvent in the next reaction.

In the hydrolysis reaction carried out according to this invention, the condensation reaction of the hydrolysis product proceeds at the same time. The product of hydrolyis accompanied by condensation normally occurs as a colorless viscous liquid with a number average molecular weight of 1400-5000. Depending upon the reaction conditions, the hydrolysis product is an oligomer with a number average molecular weight of 1400-3000 and the majority, preferably practically the whole, of the hydrolyzable group X represented by general formula (3) is replaced by OH groups and the majority, preferably 95% or more, of such OH groups is condensed. The hydrolysis product structurally consists of several types such as cage, ladder and random of silsesquioxanes and even the cage type compound has a small proportion of perfect cage type structure and a predominant proportion of imperfect cage type structure with part of the cages open. Consequently, this hydrolysis product is further heated in an organic solvent in the presence of a basic catalyst to effect condensation of siloxane linkages (referred to as recondensation) to give selectively cage type silsesquioxanes.

After separation of the water or water-containing reaction solvent, the recondensation reaction is carried out in a nonpolar solvent in the presence of a basic catalyst. Regarding the recondensation reaction conditions, the temperature is kept preferably at 100-200° C., more preferably at 110-140° C. When the temperature is too low, a driving force to advance the recondensation reaction is not generated and the reaction does not proceed. When the temperature is too high, there is the possibility of the (meth)acryloyl groups undergoing self-polymerization and it is necessary to control the reaction temperature at a proper level or to add a polymerization inhibitor or the like. The reaction time is preferably 2-12 hours. The nonpolar solvent is preferably used in an amount just enough to dissolve the hydrolysis product and the basic catalyst is used in an amount corresponding to 0.1-10 wt % of the hydrolysis product.

The nonpolar solvent may be any solvent which is insoluble or scarcely soluble in water, a hydrocarbon solvent being preferred. Hydrocarbon solvents of this kind include low-boiling nonpolar solvents such as toluene, benzene and xylene and toluene is preferred. The basic catalyst may be any of basic catalysts useful for hydrolysis and its examples are alkali metal hydroxides such as potassium hydroxide, sodium hydroxide and cesium hydroxide and ammonium hydroxides such as tetramethylammonium hydroxide, tetraethylammonium hydroxide, tetrabutylammonium hydroxide, benzyltrimethylammonium hydroxide and benzyltriethylammonium hydroxide. Preferred are those which are soluble in nonpolar solvents, for example, tetraalkylammonium salts.

It is desirable to carry out water washing, dewatering and concentration of the hydrolysis product prior to recondensation, but water washing and dewatering may be omitted. Water may be present during the recondensation reaction, but explicit addition of water is not necessary and it suffices to confine the amount of water to somewhere near that brought in by the basic catalyst solution. In the cases where the hydrolysis of the hydrolysis product does not proceed sufficiently, it is necessary to add water in an amount more than the theoretical amount needed to hydrolyze the remaining hydrolyzable groups. Usually, the hydrolysis reaction proceeds sufficiently. After the recondensation reaction, the reaction mixture is washed with water to remove the catalyst and concentrated to give a mixture of silsesquioxanes.

The silsesquioxanes obtained in this manner are constituted of several kinds of cage type silsesquioxanes which account for 70% or more of the total, although their composition varies with the reaction conditions and the condition of the hydrolysis product; for example, the cage type silsesquioxanes are constituted of 20-40% of T8 or the compound represented by general formula (5) and 40-50% of T10 or the compound represented by general formula (6) and the remainder is T12 or the compound represented by general formula (7). The compound T8 can be separated as needle crystals by leaving the siloxane mixture standing at 20° C. or below.

An unsaturated compound to be used with the silicone resin in formulating a silicone resin composition according to this invention contains at least one unsaturated group represented by —$R^3$—$CR^4$=$CH_2$ or —$CR^4$=$CH_2$ and is capable of undergoing radical copolymerization with the silicone resin. The group $R^3$ denotes an alkylene group, alkylidene group or a —OCO— group and lower alkylene and alkylidene groups containing 1-6 carbon atoms are suitable for the first two groups. The group $R^4$ denotes hydrogen or an alkyl group, preferably hydrogen or methyl group. Preferably, the unsaturated group in question is at least one kind selected from a group of acryloyl, methacryloyl, allyl and vinyl.

The silicone resin composition of this invention comprises as main ingredients A) the silicone resin and B) the unsaturated compound having an unsaturated group and copolymerizable with the silicone resin. The mix ratio ranges from 1:99 to 99:1 and, when the content of the silicone resin is designated as A and that of the unsaturated compound as B, the ratio A/B ranges preferably as $10/90 \leq A/B \leq 80/20$, more preferably as $20/80 \leq A/B \leq 60/40$. The content of the silicone resin outside this range is undesirable because the molded articles after curing show deterioration in properties such as heat resistance, transparency and water absorption when the content is short of 10% while the silicone resin composition increases in viscosity and the manufacture of molded articles becomes difficult when the content exceeds 80%.

The silicone resin composition of this invention can give a molded article of low water absorption by letting the unsaturated compound to be used with the silicone resin contain 10-100 wt % of the alicyclic unsaturated compound. In the cases where the unsaturated compound contains the alicyclic and non-alicyclic unsaturated compounds, the mix ratio (silicone resin):(nonalicyclic unsaturated compound):(alicyclic unsaturated compound) is preferably controlled at (5-80):(0-80):(0-80). However, when the aim is to attain both low water absorption and low thermal expansion simultaneously, the content of the alicyclic unsaturated compound in the unsaturated compounds is preferably 20-50 wt %. Compounds represented by the aforementioned general formula (2) are desirable as such alicyclic unsaturated compounds. On the other hand, linear unsaturated compounds and aromatic unsaturated compounds are preferred as non-alicyclic unsaturated compounds or unsaturated compounds other than alicyclic unsaturated compounds. The use of a larger proportion of the silicone resin gives a copolymer whose properties are predominantly those of the silicone resin. The use of a larger proportion of the unsaturated compound gives a copolymer whose properties are predominantly those of the resin obtained from the unsaturated compound, but some of the shortcomings are remedied. Furthermore, a large proportion of the alicyclic unsaturated compound gives a copolymer of low moisture absorption while a large proportion of the nonalicyclic unsaturated compound give a copolymer of low linear expansion.

Examples of the alicyclic unsaturated compounds represented by general formula (2) are dicyclopentanyl diacrylate (or tricyclo[$5.2.1.0^{2,6}$]decane diacrylate) when R is hydrogen and Z is the group (2a) and pentacyclo[$6.5.1.1^{3,6}.0^{2,7}.0^{9,13}$]pentadecane diacrylate when R is hydrogen and Z is the group (2b).

The unsaturated compounds are roughly divided into reactive oligomers containing 2-20 repeating constitutional units and reactive monomers of low molecular weight and low viscosity. They are also roughly divided into monofunctional unsaturated compounds containing a single unsaturated group and polyfunctional unsaturated compounds containing two or more functional groups. It is better to keep the amount of polyfunctional unsaturated compounds at an extremely low level, on the order of 1% or less, in order to obtain a good three-dimensional crosslinked product. In case the properties expected of the copolymer are good heat resistance and high strength, it is better to have the molecule contain 1.1 or more, preferably 1.5 or more, more preferably 1.6-5, of unsaturated groups. For this purpose, a monofunctional unsaturated compound is mixed with a polyfunctional unsaturated compound containing 2-5 unsaturated groups at such a ratio as to obtain the desired average number of functional groups.

The reactive oligomers include epoxy acrylates, epoxidized oil acrylates, urethane acrylates, unsaturated polyesters, polyester acrylates, polyether acrylates, vinyl acrylates, polyene/thiol, silicone acrylates, polybutadiene and polystyrylethyl methacrylate. These compounds occur as monofunctional or polyfunctional compounds.

The reactive monofunctional monomers include styrene, vinyl acetate, N-vinylpyrrolidone, butyl acrylate, 2-ethylhexyl acrylate, n-hexyl acrylate, cyclohexyl acrylate, n-decyl acrylate, isobornyl acrylate, dicyclopentenyloxyethyl acrylate, phenoxyethyl acrylate and trifluoroethyl methacrylate.

The reactive polyfunctional monomers include, besides the unsaturated compounds represented by general formula (2), tripropylene glycol diacrylate, 1,6-hexanediol diacrylate, bisphenol A diglycidyl ether diacrylate, tetraethylene glycol diacrylate, hydroxypivalic acid neopentyl glycol diacrylate, trimethylolpropane triacrylate, pentaerythritol triacrylate, pentaerythritol tetraacrylate and dipentaerythritol hexaacrylate.

A variety of reactive oligomers and monomers other than the examples given above can be used as unsaturated compounds according to this invention. These reactive oligomers and monomers may be used singly or as a mixture of two kinds or more. However, in the cases where A) the silicone resin, B) the unsaturated compound and C) unsaturated compound other than B) are used, the ratio C/(B+C) is controlled at 50 wt % or less, preferably 20 wt % or less.

The silicone resin compositions of this invention can be converted to silicone resin copolymers by radical copolymerization. For the purpose of improving the properties of the silicone resin copolymers or of promoting the radical copolymerization, a variety of additives can be incorporated in the silicone resin compositions. Additives useful for promoting the reaction include thermal polymerization initiators, thermal polymerization promotors, photopolymerization initiators, photoinitiation auxiliaries, sensitizers and the like. In case a photopolymerization initiator or a thermal polymerization initiator is used, its addition is made at a rate of 0.1-5 parts by weight, preferably 0.1-3 parts by weight, of the initiator per 100 parts by weight of the sum of the silicone resin and unsaturated compound. Addition of less than 0.1 part by weight causes insufficient curing and yields a molded article with lower strength and rigidity. On the other hand, addition in excess of 5 parts by weight may cause problems such as color development on molded articles.

Photopolymerization initiators useful for rendering silicone resin compositions photocurable include compounds derived from acetophenone, benzoin, benzophenone, thioxanthone and acylphosphine oxides. Concretely, they include trichloroacetophenone, diethoxyacetophenone, 1-phenyl-2-hydroxy-2-methylpropan-1-one, 1-hydroxycyclohexyl phenyl ketone, 2-methyl-1-(4-methylthiophenyl)-2-morpholinopropan-1-one, benzoin methyl ether, benzyl dimethyl ketal, benzophenone, thioxanthone, 2,4,6-trimethylbenzoyl-diphenylphosphine oxide, methylphenyl glyoxylate, camphorquinone, benzil, anthraquinone and Michler's ketone. These photopolymerization initiators may be used together with those photoinitiation auxiliaries and sensitizers which work effectively in combination with them.

A variety of additives can be incorporated in the silicone resin compositions of this invention as long as the incorporation does not deviate from the scope of this invention. Such additives include organic and inorganic fillers, plasticizers, flame retardants, heat stabilizers, antioxidants, light stabilizers, ultraviolet absorbers, lubricants, antistatic agents, mold release agents, foaming agents, nucleating agents, colorants, crosslinking agents, dispersing agents and resin components.

The silicone resin composition of this invention is converted to a silicone resin copolymer by radical copolymerization or it is formed into a specified shape and radically copolymerized to yield a molded article of a silicone resin copolymer. A variety of molding methods can be adopted when the resulting silicone resin copolymer is thermoplastic. However, the copolymer assumes a three-dimensional crosslinked structure when the number of reactive substituents or unsaturated groups in the molecule exceeds 1.0 and molding with cure is normally adopted in such a case. Therefore, radical copolymerization is also referred to as curing. Radical copolymerization is effected by heating or by irradiation with energy rays such as electron rays and ultraviolet light.

A silicone resin copolymer can be prepared according to this invention by curing a silicone resin composition containing a radical polymerization initiator by heating or photoirradiation. In case the copolymer (molded article) is prepared by heating, the molding temperature can be selected from room temperature to around 200° C. by proper selection of thermal polymerization initiators and promotors. In this case, a molded article of the specified shape can be obtained by effecting polymerization and curing inside a mold or on a steel belt.

In case the copolymer (molded article) is prepared by photoirradiation, ultraviolet light with wavelengths of 10-400 nm or visible light with wavelengths of 400-700 nm is used for the irradiation. Although there is no restriction on the wavelength, near ultraviolet light with wavelengths of 200-400 nm is particularly useful. Lamps useful as a source of ultraviolet light include low-pressure mercury lamps (power output: 0.4-4 W/cm), high-pressure mercury lamps (40-160 W/cm), ultrahigh-pressure mercury lamps (173-435 W/cm), metal halide lamps (80-160 W/cm), pulsed xenon lamps (80-120 W/cm) and electrodeless discharge lamps (80-120 W/cm). There lamps show characteristic spectral distributions and lamp selection is made in consideration of the kind of photoinitiator in use.

For example, the photoirradiation is effected as follows to prepare silicone resin copolymers (molded articles): a silicone resin composition is injected into a mold which has a cavity of a given shape and constructed of a transparent material such as quartz glass, polymerized by irradiation with one of the aforementioned lamps and released from the mold; or, in case a mold is not used, a silicone resin composition is applied by a doctor blade or a roll coater to a moving steel belt and polymerized by irradiation with one of the aforementioned lamps to give a molded article in sheet form.

None of the copolymers obtained according to this invention shows a glass transition temperature below 400° C. as measured with the aid of a dynamic thermomechanical analyzer (DMA) and all of them show a small decrease in dynamic viscoelastic modulus, a visible light transmission of 85% or more in the wavelength range of 400-800 nm and either a saturated water absorption (determined in conformity with JIS K 7209) of 1.0% or less or a coefficient of linear expansion of 50 ppm/K or less.

That is, depending upon the formulation, the silicone resin compositions of this invention yield two types of characteristic molded articles: one type satisfies the aforementioned requirements (a) through (d) and the other the aforementioned requirements (a) through (c) and (e).

Here is a review of the requirements: (a) the glass transition temperature is 400° C. or above; (b) the decrement of the dynamic viscoelastic modulus calculated from expression (I) or ΔE' is 60% or less, preferably 50% or less; (c) the transmission of visible light in the wavelength range of 400-800 nm is 85% or more, preferably 90% or more; (d) the saturated water absorption (determined in conformity with JIS K 7209) is 1.0% or less; and (e) the coefficient of linear expansion is 50 ppm/K or less, preferably 40 ppm/K or less. Regarding the requirements (d) and (e), it is adequate if one of the two is satisfied.

PREFERRED EMBODIMENTS OF THE INVENTION

This invention will be described with reference to the accompanying examples. The silicone resins used in the examples were prepared by the method described in Synthesis Example 1.

SYNTHESIS EXAMPLE 1

In a reaction vessel fitted with a stirrer, a dropping funnel and a thermometer were introduced 40 ml of 2-propanol (IPA) as a solvent and a 5% aqueous solution of tetramethylammonium hydroxide (aqueous solution of TMAH) as a basic catalyst. In the dropping funnel were placed 15 ml of IPA and 12.69 g of 3-methacryloyloxypropyltrimethoxysilane (MTMS: commercially available as SZ-6300 from Dow Corning Toray Silicone Co., Ltd.). The IPA solution of MTMS was added in drops over a period of 30 minutes at room temperature while stirring the reaction vessel. Upon completion of the addition of MTMS, the reaction mixture was stirred for 2 hours without heating. After the 2-hour stirring, the solvent was removed under reduced pressure and the residue was dissolved in 50 ml of toluene. The solution was washed with a saturated aqueous solution of sodium chloride until the solution became neutral and dehydrated over anhydrous magnesium sulfate. The magnesium sulfate was filtered off and the solution was concentrated to give 8.6 g of the hydrolysis product (silsesquioxane). The silsesquioxane was a colorless viscous liquid soluble in various organic solvents.

In a reaction vessel fitted with a stirrer, a Dean-Stark trap and a condenser were placed 20.65 g of the silsesquioxane obtained above, 82 ml of toluene and 3.0 g of a 10% aqueous solution of TMAH and the mixture was heated slowly to distil off the water. The mixture was further heated to 130° C. and allowed to undergo recondensation at the reflux temperature of toluene. The temperature of the reaction solution at this point was 108° C. The reaction solution was stirred for 2 hours after the toluene reflux to complete the reaction. The reaction solution was washed with a saturated aqueous solution of sodium chloride until neutral and dehydrated over anhydrous magnesium sulfate. The magnesium sulfate was filtered off and the filtrate was concentrated to give 18.77 g of a mixture of the target cage type silsesquioxanes. This mixture was a colorless viscous liquid soluble in various organic solvents.

The products of the recondensation reaction were analyzed by a combination of liquid chromatography and mass spectrometry; the formation of molecular ions from ammonium ions and the molecules represented by the aforementioned structural formulas (5), (6) and (7) is confirmed and the ratio of T8, T10, T12 and other structures is roughly 2:4:1:3, which indicates that the products consist predominantly of cage type silicone resins. Here, T8, T10 and T12 correspond respectively to formulas (5), (6) and (7).

EXAMPLE 1

A transparent silicone resin composition was prepared by mixing 25 parts by weight of the cage type silicone resins obtained in Synthesis Example 1 each of which has methacryloyl groups on all the silicon atoms in the molecule, 75 parts by weight of dicyclopentanyl diacrylate and 2.5 parts by weight of 1-hydroxycyclohexyl phenyl ketone as a photoinitiator.

The composition was cast to a thickness of 0.4 mm with the use of a roll coater and cured to form a sheet of the prescribed thickness by irradiating with a high-pressure mercury lamp (power output; 30 W/cm) to an integrated exposure of 2000 mJ/cm$^2$.

EXAMPLE 2-5 AND COMPARATIVE EXAMPLES 1-7

Silicone resin compositions were formulated as in Table 1 and molded as in Example 1. The properties of the molded articles are shown in Table 2.

The symbols used in Table 1 stand for the following compounds.

A: The compound obtained in Synthesis Example 1

B: The silanol-free silicone resin obtained according to the method described in JP10-251407-A C: Trimethylolpropane triacrylate D: Dicyclopentanyl diacrylate [Light Acrylate DCP-A commercially available from Kyoeisha Chemical Co., Ltd.; corresponding to the compound represented by general formula (2) wherein Z is (a2) and R is hydrogen]

E: Dipentaerythritol hexaacrylate

F: 1-Hydroxycyclohexyl phenyl ketone (polymerization initiator)

TABLE 1

|  | A | B | C | D | E | F |
|---|---|---|---|---|---|---|
| Example 1 | 25 | — | — | 75 | — | 2.5 |
| 2 | 50 | — | — | 50 | — | 2.5 |
| 3 | 50 | — | 50 | — | — | 2.5 |
| 4 | 20 | — | 50 | 30 | — | 2.5 |
| 5 | 50 | — | — | — | 50 | 2.5 |
| 6 | 25 | — | — | 10 | 65 | 2.5 |
| 7 | 25 | — | — | — | 75 | 2.5 |
| Comparative example 1 | — | 20 | 80 | — | — | 2.5 |
| 2 | — | 20 | 50 | 30 | — | 2.5 |
| 3 | — | 20 | 40 | 40 | — | 2.5 |

TABLE 2

|  | Flexural modulus (Mpa) | Water absorption (%) | Tg (° C.) | ΔE' (%) | Total light transmission (%) | Coefficient of linear expansion (ppm/K) |
|---|---|---|---|---|---|---|
| Example 1 | 3150 | 0.5 | >400 | 57.0 | 91.2 | 75 |
| 2 | 3090 | 0.8 | >400 | 43.8 | 91.5 | 71 |
| 3 | 3380 | 1.8 | >400 | 28.4 | 91.8 | 48 |
| 4 | 3430 | 0.9 | >400 | 37.0 | 91.2 | 71 |
| 5 | 3120 | 2.4 | >400 | 29.1 | 90.2 | 47 |
| 6 | 3580 | 2.8 | >400 | 26.4 | 89.5 | 37 |
| 7 | 3220 | 2.9 | >400 | 27.0 | 90.0 | 42 |
| Comparative example 1 | 2730 | 1.2 | 385 | 57.0 | 92.0 | 78 |
| 2 | 2620 | 1.0 | 380 | 66.6 | 92.0 | 87 |
| 3 | 2750 | 0.9 | 372 | 76.8 | 91.9 | 98 |

1) Flexural modulus (determined in conformity with JIS K 7171): test speed, 0.3 mm/min; distance between supports, 12 mm; radius of support, 0.5 mm; radius of indenter, 1.5 mm
2) Water absorption (determined in conformity with JIS K 7209): conditions for preliminary drying of specimens, at 50° C. for 24 hr
3) Glass transition temperature (Tg): determined by dynamic thermomechanical analysis; rate of temperature rise, 5° C./min; distance between chucks, 10 mm
4) ΔE': The value calculated from the dynamic viscoelastic modulus at 30° C. ($E'_{30}$) and the dynamic viscoelastic modulus at 200° C. ($E'_{200}$) using expression (I)
5) Total light transmission (determined in conformity with JIS K 7361-1): thickness of specimen, 0.4 mm
6) Coefficient of linear expansion: determined by thermomechanical analysis; rate of temperature, rise 5° C./min; compression load, 0.1 N

INDUSTRIAL APPLICABILITY

According to this invention, it is possible to obtain molded articles with excellent heat resistance, transparency and dimensional stability useful for optical applications such as lenses, optical disks, optical fibers and substrates for flat panel displays and for window materials for various transport machines and houses. The molded articles are transparent, light and highly impact-resistant and they are industrially valuable as they find a broader range of applications as substitutes for glass.

What is claimed is:

1. A silicone resin composition which comprises
   a silicone resin mainly constituted of a polyorganosilsesquioxane represented by general formula (1)

$$[RSiO_{3/2}]_n \quad (1)$$

(wherein R is an organic functional group containing a (meth)acryloyl group and n is 8, 10 or 12) and containing a cage type structure in the constitutional unit and an unsaturated compound containing at least one unsaturated group represented by —R³—CR⁴=CH₂ or —CR⁴=CH₂ (wherein R³ is an alkylene group, an alkylidene group or a —OCO— group and R⁴ is hydrogen or an alkyl group) in the molecule and radically copolymerizable with said silicone resin at a ratio by weight of 1:99 to 99:1,
   wherein 10-100 wt % of the unsaturated compound copolymerizable with the silicone resin is accounted for by an alicyclic unsaturated compound represented by the following general formula (2)

(structure) (2)

(wherein Z is a group represented by (2a) or (2b)

(structure) (2a)

(structure) (2b)

and R is hydrogen or methly group).

2. A silicone resin composition as described in claim 1 wherein the composition is formulated from the silicone resin, nonalicyclic unsaturated compound and alicyclic unsaturated compound at a ration by weight (5-80):(0-80):(0-80).

3. A silicone resin composition as described in claim 1 or 2 wherein the silicone resin is obtained by submitting a silicon compound represented by general formula (3)

$$RSiX_3 \quad (3)$$

(wherein R is an organic functional group containing a (meth)acryloyl group and X is a hydrolyzable group) to hydrolysis and partial condensation in a polar solvent in the presence of a basic catalyst and submitting the hydrolysis product further to recondensation in a nonpolar solvent in the presence of a basic catalyst, contains the same number of silicon atoms and (meth)acryloyl groups in the molecule and has a cage type structure.

4. A molded article of silicone resin obtained by radically copolymerizing the silicone resin composition described in claim 1 or 2.

5. A molded article of silicone resin as described in claim 4 which satisfies the following requirements (a) through (c) and at least one of (d) and (e):
   (a) the glass transition temperature is 400° C. or above;
   (b) the decrement of the dynamic viscoelastic modulus ΔE' calculated from the following expression is 60% or less $$\Delta E' = (E'_{30} - E'_{200})/E'_{30} \quad (1)$$

wherein E'30 denotes the dynamic viscoelastic modulus at 30° C. and E'200 at 200° C.,
  (c) the transmission of visible light in the wavelength range of 400-800 nm is 85% or more;
  (d) the saturated water absorption (determined in conformity with JIS K 7209) is 1.0% or less; and
  (e) the coefficient of linear expansion is 50 ppm/k or less.

6. A molded article of silicone resin as described in claim 5 wherein the coefficient of linear expansion specified as requirement (e) is 40 ppm/K or less.

7. A method for making a molded article of silicone resin which comprises radically copolymerizing the silicone resin composition described in claim 1 or 2 by heating or irradiating with energy rays.

8. A molded article of silicone resin obtained by radically copolymerizing the silicone resin composition described in claim 3.

9. A molded article of silicone resin as described in claim 8 which satisfies the following requirements (a) through (c) and at least one of (d) and (e):
  (a) the glass transition temperature is 400° C. or above;
  (b) the decrement of the dynamic viscoelastic modulus ΔE' calculated from the following expression is 60% or less;

$$\Delta E' = (E'30 - E'200)/E'30 \quad (1)$$

wherein E'30 denotes the dynamic viscoelastic modulus at 30° C. and E'200 at 200° C.,
  (c) the transmission of visible light in the wavelength range of 400-800 nm is 85% or more;
  (d) the saturated water absorption (determined in conformity with JIS K 7209) is 1.0% or less; and
  (e) the coefficient of linear expansion is 50 ppm/k or less.

10. A molded article of silicone resin as described in claim 9 wherein the coefficient of linear expansion specified as requirement (e) is 40 ppm/K or less.

11. A method for making a molded article of silicone resin which comprises radically copolymerizing the silicone resin composition described in claim 3 by heating or irradiating with energy rays.

12. A molded article of silicone resin obtained by radically copolymerizing a silicone resin composition which comprises a silicone resin mainly constituted of a polyorganosilsesquioxane represented by general formula (1)

$$[RSiO_{3/2}]_n \quad (1)$$

(wherein R is an organic functional group containing a (meth)acryloyl group and n is 8, 10 or 12) and containing a cage type structure in the constitutional unit and an unsaturated compound containing at least one unsaturated group represented by $-R^3-CR^4=CH_2$ or $-CR^4=CH_2$ (wherein $R^3$ is an alkylene group, an alkylidene group or a $-OCO-$ group and $R^4$ is hydrogen or an alkyl group) in the molecule and radically copolymerizable with said silicon resin at a ratio by weight of 1:99 to 99:1,
  wherein said molded article satisfies the following requirements (a) through (c) and at least one of (d) and (e):
  (a) the glass transition temperature is 400° C. or above;
  (b) the decrement of the dynamic viscoelastic modulus ΔE' calculated from the following expression is 60% or less;

$$\Delta E' = (E'30 - E'200)/E'30 \quad (1)$$

wherein E'30 denotes the dynamic viscoelastic modulus at 30° C. and E'200 at 200° C.,
  (c) the transmission of visible light in the wavelength range of 400-800 nm is 85% or more;
  (d) the saturated water absorption (determined in conformity with JIS K 7209) is 1.0% or less; and
  (e) the coefficient of linear expansion is 50 ppm/k or less.

13. A molded article of silicone resin, as described in claim 12 wherein the silicone resin is obtained by submitting a silicon compound represented by general formula (3)

$$RSiX_3 \quad (3)$$

(wherein R is an organic functional group containing a (meth)acryloyl group and X is a hydrolyzable group) to hydrolysis and partial condensation in a polar solvent in the presence of a basic catalyst and submitting the hydrolysis product further to recondensation in a nonpolar solvent in the presence of a basic catalyst, contains the same number of silicon atoms and (meth)acryloyl groups in the molecule and has a cage type structure.

14. A molded article of silicone resin as described in claim 12 wherein the coefficient of linear expansion specified as requirement (e) is 40 ppm/K or less.

15. A method for making a molded article of silicone resin as described in claim 12 wherein the silicone resin composition is radically copolymerized by heating or irradiating with energy rays.

16. A molded article of silicone resin as described in claim 13 wherein the coefficient of linear expansion specified as requirement (e) is 40 ppm/K or less.

17. A method for making a molded article of silicone resin as described in claim 13, wherein the silicone resin composition is radically copolymerized by heating or irradiating with energy rays.

* * * * *